(12) United States Patent
Allore et al.

(10) Patent No.: US 6,779,336 B2
(45) Date of Patent: Aug. 24, 2004

(54) COOLED VARIABLE GEOMETRY EXHAUST NOZZLE

(75) Inventors: James P. Allore, South Windsor, CT (US); Stephen A. Paul, Andover, CT (US); Charles D. Stoner, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 89 days.

(21) Appl. No.: 10/190,277

(22) Filed: Jul. 5, 2002

(65) Prior Publication Data

US 2004/0003585 A1 Jan. 8, 2004

(51) Int. Cl.⁷ .............................. F02K 1/12; F02C 7/18
(52) U.S. Cl. ...................... 60/232; 60/266; 239/127.3; 239/265.41; 239/265.39
(58) Field of Search ............... 60/266, 232; 239/265.33, 239/265.37, 265.41, 127.1, 127.3, 265.35, 265.39

(56) References Cited

U.S. PATENT DOCUMENTS

| | | | | |
|---|---|---|---|---|
| 3,081,596 A | * | 3/1963 | Barrett et al. | 239/127.3 |
| 4,081,137 A | * | 3/1978 | Sutton et al. | 239/127.3 |
| 4,203,286 A | * | 5/1980 | Warburton | 60/266 |
| 4,440,347 A | * | 4/1984 | Madden et al. | 239/265.39 |
| 4,544,098 A | * | 10/1985 | Warburton | 239/127.3 |
| 5,101,624 A | * | 4/1992 | Nash et al. | 60/266 |
| 5,141,154 A | * | 8/1992 | Barcza | 239/127.3 |
| 5,335,489 A | * | 8/1994 | Thayer | 60/230 |
| 5,775,589 A | * | 7/1998 | Vdoviak et al. | 239/127.1 |
| 6,295,805 B1 | * | 10/2001 | Lackey et al. | 60/204 |
| 6,360,527 B1 | * | 3/2002 | Feder et al. | 60/232 |

* cited by examiner

Primary Examiner—Ted Kim
(74) Attorney, Agent, or Firm—Kenneth C. Baran

(57) ABSTRACT

A variable geometry exhaust nozzle 10 for a turbine engine includes convergent and divergent flaps 12, 18 that circumscribe a gaspath 26 and define convergent and divergent nozzle sections 30, 32 with a throat 34 therebetween. A projection 56, which resides on the divergent flaps, extends radially inwardly from the nozzle. The nozzle also includes a coolant flowpath comprising an interior space 44 in the nozzle, an intake 58 for admitting coolant C into the interior space, and a coolant outlet 60 aft of the intake for discharging the coolant from the interior space. The intake resides forward of the throat. During operation, a coolant film flows along the radially inner surface of the nozzle. The projection encourages a portion of the coolant film to enter and flow through the the coolant flowpath to convectively cool the nozzle. The location of the intake, forward of the throat, takes advantage of the locally high gaspath pressure to ensure that an adequate quantity of the coolant enters and flows through the coolant flowpath.

14 Claims, 3 Drawing Sheets

COOLED VARIABLE GEOMETRY EXHAUST NOZZLE

STATEMENT OF GOVERNMENT INTEREST

This invention was made under a U.S. Government Contract and the Government has rights therein.

TECHNICAL FIELD

This invention relates to cooled, variable geometry exhaust nozzles for turbine engines and particularly to a simple and effective arrangement for supplying coolant to the interior of the divergent section of a variable geometry, convergent divergent nozzle.

BACKGROUND OF THE INVENTION

A typical gas turbine engine for high performance military aircraft often employs an afterburner and a convergent divergent (CD) exhaust nozzle. The nozzle circumscribes an axially extending engine centerline and radially bounds the aftmost portion the engine's main gaspath. A stream of hot, gaseous products of combustion flows axially through the nozzle to produce thrust for powering the aircraft. The CD nozzle includes a convergent section, whose cross sectional area converges in the direction of gas flow, and a divergent section whose cross sectional area diverges in the direction of gas flow. The convergent and divergent sections are serially arranged to define a throat, which is the smallest cross sectional area of the nozzle. The aft extremity of the divergent section defines a nozzle discharge plane and a corresponding discharge area.

It is often necessary to cool the nozzle to protect it from the heat of the combustion gases. One effective cooling technique is film cooling. Film cooling involves flowing a film of coolant along the radially inner surface of the nozzle, which is the surface directly exposed to the gases. Unfortunately, the effectiveness of the coolant film progressively decays as it flows along the surface being cooled because the coolant intermixes with the hot combustion gases. Therefore, film cooling alone may not be satisfactory for nozzles that are particularly long or that are exposed to extremely high temperatures. In such nozzles, the film cooling is augmented by internal convective cooling in which coolant flows through an interior space in the nozzle.

Many CD nozzles are variable geometry nozzles. Variable geometry nozzles comprise a set of convergent flaps pivotably connected at their forward ends to an engine case and a set of divergent flaps pivotably joined to the aft ends of the convergent flaps. The flaps may be monolithic, or they may be constructed of radially inner and outer skins separated by spacers. The angular orientation of the flaps, and therefore the geometry of the nozzle, is governed by a control system that includes an automatic controller and associated actuators and mechanical linkages. During engine operation, the control system causes the convergent flaps to pivot relative to the case and the divergent flaps to pivot about their respective connections to the convergent flaps. By governing the orientations of the flaps, the control system adjusts the throat and nozzle discharge areas.

Variable geometry nozzles are superior to fixed geometry nozzles in that the adjustability of the throat and discharge areas allows for optimized performance over a wide range of operating conditions. However they also suffer from disadvantages relative to fixed geometry nozzles. One of these disadvantages is the difficulty of introducing convective coolant into the interior space between the skins of the divergent flaps to augment the film cooling applied to their gaspath exposed surfaces. According to past practice, each divergent flap includes inlet openings at its forward end and exhaust openings aft of the inlet openings. The inlet and exhaust openings cooperate with the interior space between the flap skins to define a convective coolant flowpath. During operation, the inlet openings capture some of the film coolant flowing along the radially inner surface of the nozzle. The captured coolant flows through the interior of the flap and discharges back into the combustion gas stream through the exhaust openings. Although this arrangement is satisfactory in some applications, its effectiveness may be limited for at least two reasons. First the inlet openings necessarily reside in the divergent flap, which is aft of the nozzle throat. Because the pressure of the combustion gases drops precipitously as the gases flow across the throat, the pressure gradient from the inlet openings to the exhaust openings may be too small to encourage adequate convective coolant flow through the convective coolant flowpath. Second, the openings themselves reside in a plane substantially parallel to the direction of flow of the film coolant, and therefore are poorly oriented for capturing part of the coolant film.

One possible way to achieve more effective convective cooling is to capture a portion of the film coolant at a location forward of the throat where the combustion gas pressure is relatively high, and channel the captured coolant across the joint between the convergent and divergent flaps. However this approach requires that a leak resistant coolant path be established to bridge across the joint. Such a coolant path must accommodate the relative motion between the convergent and divergent flaps, and therefore introduces undesirable weight, cost and complexity.

What is needed is a simplified arrangement for effectively introducing coolant into the interior of exhaust nozzle divergent flaps.

SUMMARY OF THE INVENTION

It is, therefore, an object of the invention to effectively cool the divergent flaps of a convergent divergent exhaust nozzle and to do so with a minimum of weight, cost and complexity. It is a further object of the invention to provide a simple way to introduce convective coolant into the interior of the divergent flaps.

According to the invention, A variable geometry exhaust nozzle includes convergent and divergent flaps that circumscribe a gaspath and define convergent and divergent nozzle sections with a throat therebetween. A projection, which ideally resides on the divergent flaps, extends radially inwardly from the nozzle forward of the throat. The nozzle also includes a coolant flowpath comprising an interior space in the nozzle, an intake for admitting coolant into the interior space, and a coolant outlet aft of the intake for discharging the coolant from the interior space. The intake resides forward of the throat. During operation, a coolant film flows along the radially inner surface of the nozzle. The projection encourages a portion of the coolant film to enter and flow through the coolant flowpath to convectively cool the nozzle. The location of the intake, forward of the throat, takes advantage of the locally high gaspath pressure to ensure that an adequate quantity of the coolant enters and flows through the coolant flowpath.

BEST MODE FOR CARRYING OUT THE INVENTION

Figure 1:
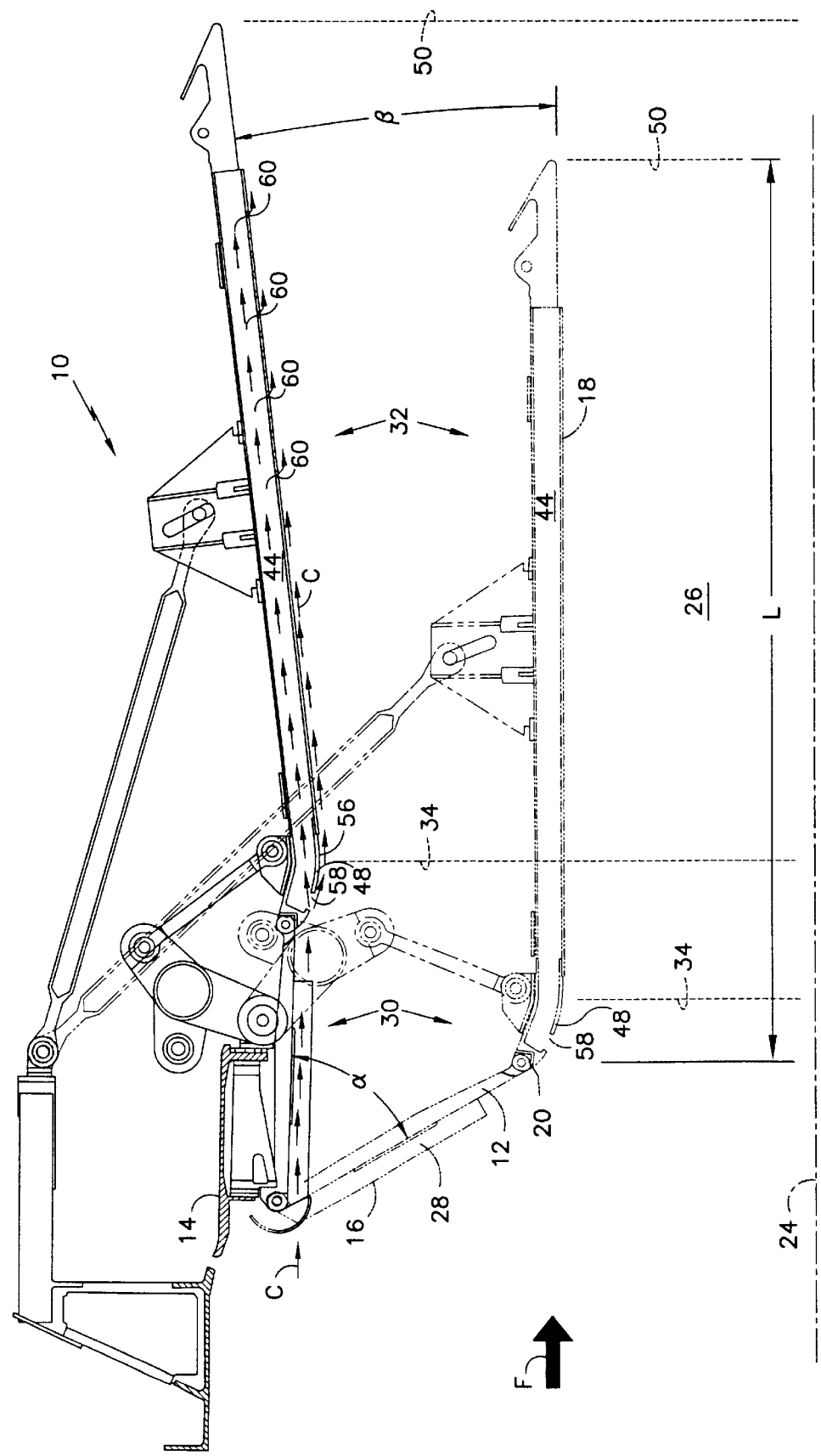
FIG. 1 is a cross sectional side elevation view of a variable geometry exhaust nozzle of the present invention with the nozzle shown in open and closed positions, the nozzle being illustrated on only one side of its centerline.
Figure 2:
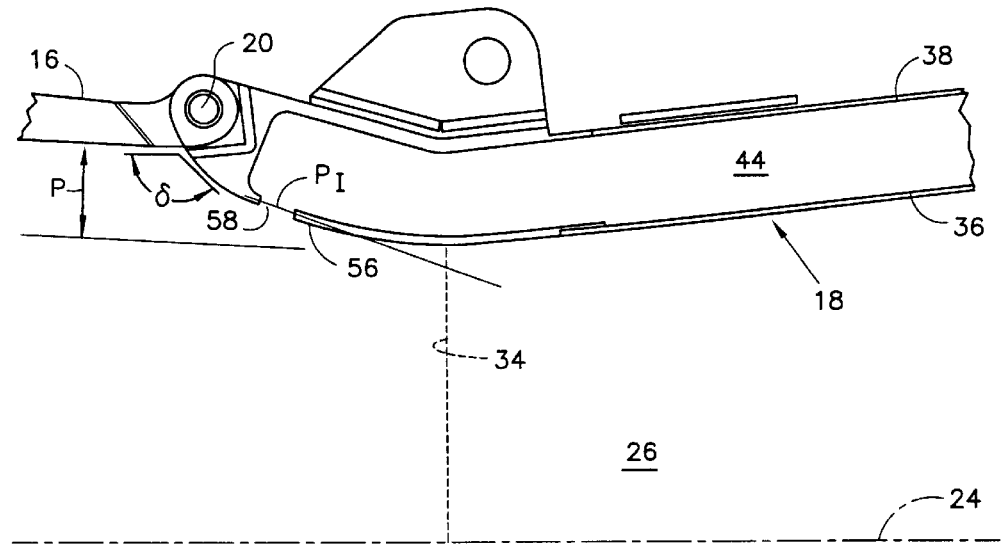
FIG. 2 is an enlarged cross sectional side elevation view showing the forward end of a divergent flap of the nozzle of FIG. 1.

FIGS. 1 and 2 show a variable geometry, convergent divergent exhaust nozzle 10 for the engine of a high performance military aircraft. The illustration depicts the nozzle in both an open position (solid lines) which is used during afterburning operation, and in a closed position (phantom lines) which is used during non-afterburning operation. The nozzle includes a plurality of circumferentially distributed convergent flaps, such a representative flap 12, each pivotably connected to a stationary frame 14 and each having a sheet metal liner panel 16 secured thereto. The nozzle also includes a plurality of circumferentially distributed divergent flaps, such as representative flap 18 each having a length L. The divergent flaps are pivotably connected at joint 20 to the aft ends of the convergent flaps. A plurality of seals, not illustrated, are distributed circumferentially intermediate the divergent flaps. Taken collectively, the convergent and divergent flaps and the inter-flap seals circumscribe an axially extending engine centerline 24 and define the radially outer boundary of a gaspath 26. The liner panels 16, taken collectively, form a liner that cooperates with the convergent flaps to define an annular coolant passageway 28. The passageway guides a coolant film along the radially inner surface of the convergent flaps.

The flaps 12, 18 define convergent and divergent sections 30, 32 of the nozzle with a throat 34 therebetween. The throat is the minimum cross sectional area of the nozzle. As seen in the illustration, the convergent section 30 is defined by the convergent flap and the forward end of the divergent flap. The divergent section 32 is defined by the rest of the divergent flap.

Figure 3:
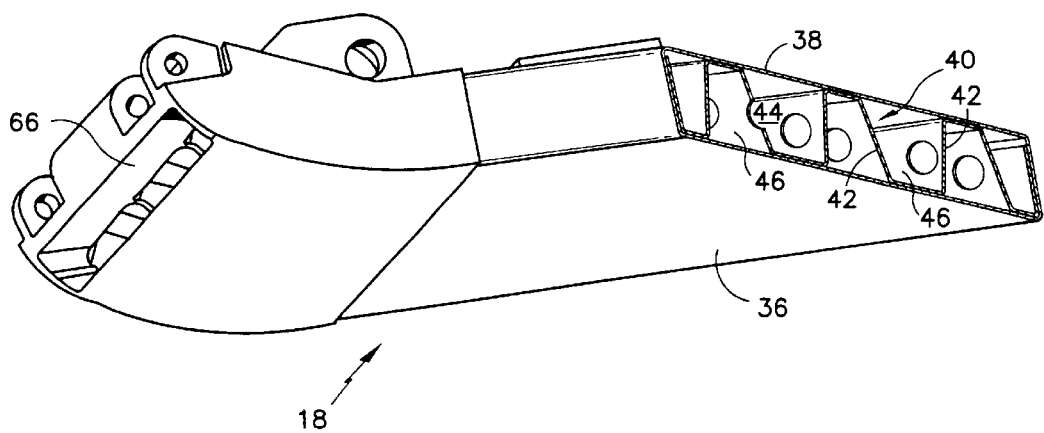
FIG. 3 is a perspective view showing a divergent flap of the nozzle of FIG. 1 with the aft end of the flap cut away to expose internal features and with an alternative coolant intake illustrated near the forward end of the flap.

Referring additionally to FIG. 3, each divergent flap comprises radially inner and outer skins 36 38, secured to a truss 40 comprised of ribs 42. The truss imparts structural rigidity to the flap and serves as a spacer to separate the skins and define an interior space 44. In the illustrated embodiment, the ribs partition the interior space into a series of channels 46. The forward end of each divergent flap is a contoured lip 48. The aft ends of the divergent flaps define a nozzle discharge plane 50, which has a corresponding nozzle discharge area.

A control system for the nozzle comprises an automatic controller, not shown, along with an actuator and associated mechanical links. During operation, the control system governs the angular orientations of the convergent and divergent flaps to adjust the nozzle throat area and discharge area. The convergent flaps are positionable over a range of angular orientations α, and the divergent flaps are similarly positionable over a corresponding spectrum of angular orientations β.

The nozzle includes a projection 56 (FIG. 1) that extends radially inwardly from the divergent flaps into the gaspath 26. The projection is formed by a cooperation amongst the lip 48 and the relative angular orientations of the convergent and divergent flaps 12, 18. In general, the projection may be present across the entire range and spectrum of flap orientations. However, in the illustrated embodiment the lip 48 is contoured so that the projection is present over only part of the range and spectrum of orientations. In the illustrated nozzle, the projection is evident with the nozzle in its open position, where the projection has a radial dimension P (FIG. 2) and is absent at the closed position. As seen most clearly in FIG. 2, the projection may be thought of as a ramp defined by a ramp angle δ of between about 90 and 150 degrees.

Figure 4:
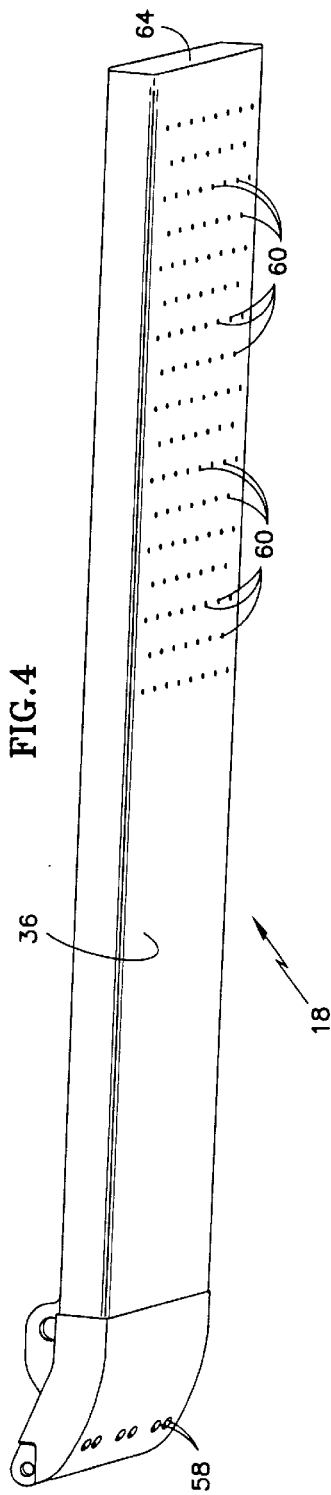
FIG. 4 is a perspective view showing a divergent flap of the nozzle of FIG. 1 and illustrating a coolant outlet.

The nozzle includes a coolant flowpath comprising the interior space 44 an intake, and outlet. The intake illustrated in FIGS. 1, 2 and 4 comprises a set of apertures 58 penetrating the radially inner skin 36 of each divergent flap. The coolant intake is located aft of the joint 20, but no further aft than the nozzle throat 34. The illustrated coolant outlet is a set of discharge ports 60 that penetrate the inner skin aft of the intake. Alternatively, the outlet may be one or more discharge openings 64 at the aft end of the divergent section. Or, the outlet may comprise the discharge ports and discharge openings in combination. The illustrated discharge ports penetrate the inner skin aft of about 50% of the length L of the divergent flap and are distributed substantially entirely throughout the region of the flap aft of about 50% of the flap length. Although the ports 60 are depicted as small openings, they may take on other forms, such as circumferentially elongated slots.

During operation, a stream of combustion gases flows through the nozzle in direction F and exhausts to the atmosphere to produce thrust for powering the aircraft. Concurrently, a film of coolant C flows along the radially inner surfaces of the flaps. The coolant film helps to shield the flaps from the intense heat of the combustion gases. Typically, the coolant C is relatively cool pressurized air extracted from the engine's compressor. The coolant encounters the intake apertures 58 upstream or forward of the nozzle throat. The intake apertures divert a portion of the coolant through the convective coolant flowpath defined by intake 58, interior space 44 and outlet 60 or 64. The non-diverted portion of coolant continues to flow along the radially inner surface of the nozzle to provide film cooling.

Figure 5:
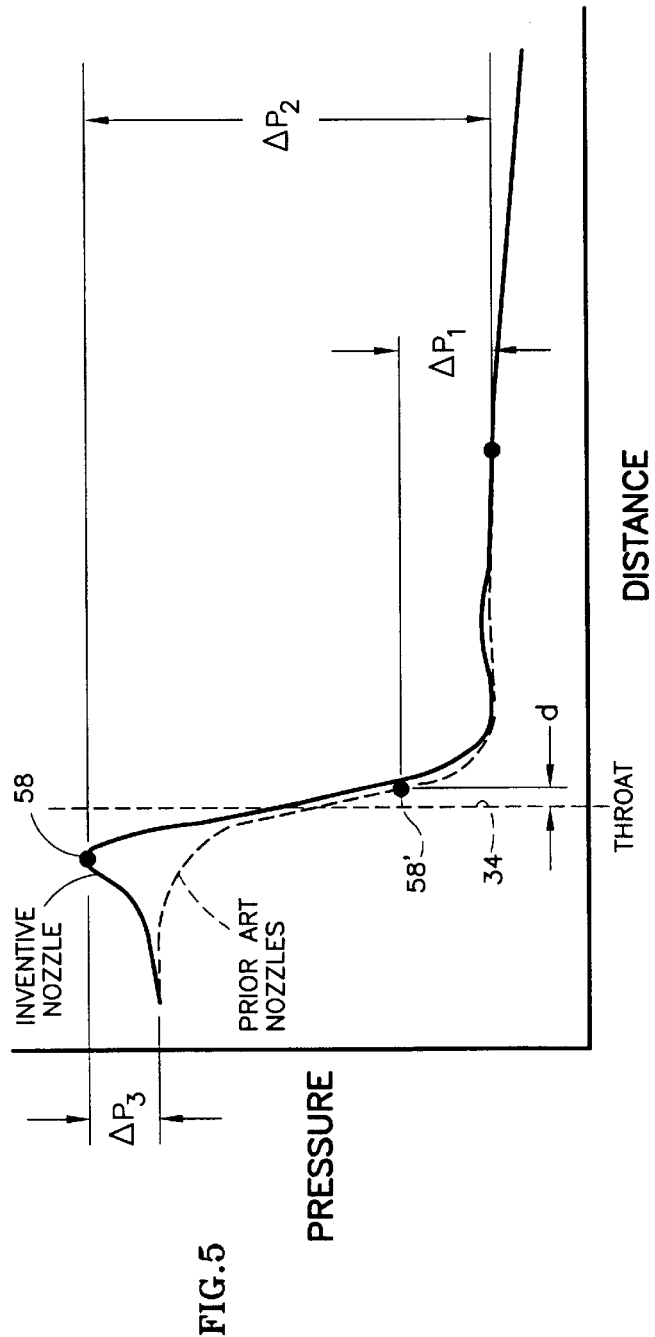
FIG. 5 is a graph of gas pressure versus distance contrasting the operation of the present invention with that of a conventional variable geometry nozzle.

The benefit of the inventive nozzle is seen best in FIG. 5, which schematically illustrates the pressure of the combustion gases as a function of axial distance along the nozzle. In a pre-inventive nozzle (phantom lines) the coolant intake 58' resides aft of the throat 34 and, as a practical matter, is offset a small distance d from the forwardmost extremity of the divergent flap. As a result, film coolant flowing along the radially inner surface of the nozzle encounters the intake 58' after the combustion gas pressure has decreased signficantly. Consequently, the pressure gradient $\Delta p_1$ available to drive coolant through the convective coolant flowpath is small. By contrast, film coolant flowing along the radially inner surface of the inventive nozzle (solid line) encounters the intake apertures 58 upstream or forward of the throat where the pressure gradient $\Delta p_2$ is relatively high. The high pressure gradient promotes coolant flow through the convective coolant flowpath.

Further benefit is realized when the projection 56 is present, as it is with the nozzle in its open position. The projection 56 partially obstructs the progress of the coolant film and provokes a local pressure rise $\Delta p_3$ in the vicinity of the intake apertures. The local pressure rise $\Delta p_3$ contributes to the pressure gradient $\Delta p_2$. In addition, the intake apertures reside in a plane $P_I$ (FIG. 2) nonparallel to the local direction of fluid flow, and are therefore well oriented to ingest coolant.

The designer of the nozzle can prescribe the exact shape of the projection 56 in relation to the orientations $\alpha$, $\beta$ of the convergent and divergent flaps, and can also prescribe the exact location of the apertures 58 in relation to the pressure of the combustion gases. By doing so, the designer specifies whether or not the projection 56 extends into the gaspath at any given angular orientations of the flaps and also regulates the orientation of the apertures 58 relative to the local direction of fluid flow. As a result, the designer can control the proportion of the coolant C diverted through the convective coolant path at various flap orientations.

The projection 56 need not have the shape shown in the illustrations. Other shapes that project into the gaspath and that satisfy other relevant constraints (such as minimizing aerodynamic losses or meeting producibility cost targets) may be at least as satisfactory as the illustrated shape.

FIG. 3 shows an alternative embodiment of the invention in which the intake is a scoop 66. The mouth of the scoop, like the intake apertures 56, resides no further aft than the nozzle throat. The scoop captures a significant quantity of the film coolant flowing along the radially inner surface of the nozzle.

Although this invention has been shown and described with reference to detailed embodiments thereof, it will be understood by those skilled in the art that various changes in form and detail may be made without departing from the invention as set forth in the accompanying claims.

We claim:

1. A variable geometry exhaust nozzle, comprising:
   a plurality of convergent flaps each having an aft end and each positionable across a range of angular orientations;
   a plurality of divergent flaps pivotably connected by a joint to the aft ends of the convergent flaps and each positionable across a spectrum of angular orientations;
   wherein the flaps circumscribe a gaspath and define convergent and divergent nozzle sections with a throat therebetween;
   a coolant intake for admitting coolant to an interior space in the nozzle, the intake located aft of the joint and no further aft than the throat; and
   a coolant outlet located aft of the intake for discharging the admitted coolant from the interior space.

2. The nozzle of claim 1 wherein the intake is a scoop residing on the divergent flaps.

3. The nozzle of claim 1 wherein the intake is a set of apertures penetrating the divergent flaps.

4. The nozzle of claim 1 wherein the outlet is at least one of:
   a) one or more discharge openings at the aft end of the divergent section; and
   b) one or more discharge ports penetrating the divergent flaps to place the interior space in fluid communication with the gaspath.

5. The nozzle of claim wherein 4 the divergent flaps have a length and the discharge ports penetrate the divergent flaps aft of about 50% of the flap length.

6. The nozzle of claim 5 wherein the discharge ports are distributed substantially entirely throughout a region aft of about 50% of the flap length.

7. The nozzle of claim 1 wherein a coolant stream flows along the nozzle and the intake resides in a plane nonparallel to the local direction of fluid flow.

8. The nozzle of claim 1 wherein the projection provokes a local pressure rise in fluid flowing through the nozzle.

9. The nozzle of claim 1 wherein over at least part of the range and spectrum of orientations, a projection extends radially inwardly from the nozzle forward of the nozzle throat.

10. The nozzle of claim 9 wherein the projection is defined by forward ends of the divergent flaps in cooperation with an angular orientation of the convergent and divergent flaps.

11. The nozzle of claim 9 wherein the coolant intake resides on the projection.

12. The nozzle of claim 1 wherein the coolant intake resides on the divergent flaps.

13. The nozzle of claim 1 wherein the coolant intake is exposed to a gaspath.

14. A convergent divergent exhaust nozzle, comprising:
   a plurality of convergent flaps each having an aft end and each pivotably connected to a frame, the convergent flaps being pivotable over a range of orientations and collectively circumscribing part of a gaspath;
   a plurality of divergent flaps each comprising an inner and outer skin separated by a spacer to define an interior space between the skins, each divergent flap also having a forward end, the forward ends being pivotably connected to the aft ends of the convergent flaps and being pivotable over a spectrum of orientations, the flaps defining a nozzle throat and the divergent flaps being contoured to present a radially inwardly extending projection to the gaspath over at least part of the range and spectrum of orientations, the divergent flaps being penetrated by a plurality of intake apertures residing no further aft than the throat, the divergent flaps also including an outlet aft of the intake apertures, the intake apertures and discharge ports cooperating with the interior space to establish a coolant flowpath;
   wherein a stream of film coolant flows along the flaps and the projection diverts a portion of the film coolant stream into the coolant flowpath.

* * * * *